US012786247B2

(12) United States Patent
Friel et al.

(10) Patent No.: US 12,786,247 B2
(45) Date of Patent: Nov. 3, 2026

(54) MESSAGING LAYER SECURITY (MLS) FOR UNVERIFIED PARTICIPANTS

(71) Applicant: Cisco Technology, Inc., San Jose, CA (US)

(72) Inventors: Owen B. Friel, Galway (IE); Richard Lee Barnes, Arlington, VA (US); Anthony Mulchrone, London (GB); Rod C. Hughes, Gainesville, FL (US); Michael Thomas McGary, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 131 days.

(21) Appl. No.: 18/978,134

(22) Filed: Dec. 12, 2024

(65) Prior Publication Data

US 2026/0113359 A1 Apr. 23, 2026

Related U.S. Application Data

(60) Provisional application No. 63/708,864, filed on Oct. 18, 2024.

(51) Int. Cl.

*H04L 9/40* (2022.01)
*H04L 12/66* (2006.01)
*H04L 12/56* (2006.01)

(52) U.S. Cl.

CPC ............ *H04L 63/205* (2013.01); *H04L 12/66* (2013.01)

(58) Field of Classification Search

CPC ................. H04L 12/66; H04L 63/0428; H04L 63/065; H04L 63/205

See application file for complete search history.

(56) References Cited

U.S. PATENT DOCUMENTS

| | | | | |
|---|---|---|---|---|
| 8,228,902 | B2 * | 7/2012 | Mehmood | H04M 7/123 370/353 |
| 8,533,339 | B2 * | 9/2013 | Wing | H04L 61/4511 709/227 |
| 9,054,922 | B2 | 6/2015 | Wing et al. | |
| 10,320,856 | B2 * | 6/2019 | Rosenberg | H04L 67/141 |

(Continued)

OTHER PUBLICATIONS

Amazon Web Services, Inc., "AWS Wickr Overview," https://docs.aws.amazon.com/wickr/latest/adminguide/what-is-wickr.html, Dec. 2022, 2 pages.

(Continued)

*Primary Examiner* — Gary S Gracia
(74) *Attorney, Agent, or Firm* — Edell, Shapiro & Finnan, LLC

(57) ABSTRACT

Presented herein are techniques for providing a Messaging Layer Security (MLS) gateway that is a verified participant in an MLS group. The MLS gateway joins an MLS group as a first verified member of the MLS group for secure messaging among participants of the MLS group. The MLS gateway transmits first secure content obtained from a first participant to one or more second participants of the MLS group. The first participant is a non-MLS capable participant, and the one or more second participants of the MLS group are verified MLS capable participants. The MLS gateway transmits second secure content obtained from the one or more second participants of the MLS group to the first participant.

20 Claims, 12 Drawing Sheets

(56) References Cited

U.S. PATENT DOCUMENTS

| | | | | |
|---|---|---|---|---|
| 10,574,710 | B2 | 2/2020 | Rosenberg et al. | |
| 11,483,145 | B2 * | 10/2022 | Matsui | H04L 9/3073 |
| 11,546,398 | B1 * | 1/2023 | Carofiglio | H04L 65/403 |
| 11,729,216 | B1 * | 8/2023 | Roques | H04L 51/066 709/223 |
| 12,160,505 | B2 * | 12/2024 | Tolba | H04L 9/0891 |
| 12,206,715 | B2 * | 1/2025 | Samain | H04L 65/1083 |
| 12,278,910 | B2 * | 4/2025 | Dillon | H04L 9/3247 |
| 12,301,703 | B2 * | 5/2025 | Barnes | H04L 9/14 |
| 12,407,688 | B2 * | 9/2025 | Powell | H04L 63/101 |
| 12,641,081 | B2 * | 5/2026 | Barnes | H04L 63/0876 |
| 2007/0180237 | A1 * | 8/2007 | Grieco | H04L 63/0428 713/163 |
| 2009/0086740 | A1 * | 4/2009 | Al-Bakri | H04L 65/1073 370/401 |
| 2011/0164608 | A1 * | 7/2011 | Lindgren | H04L 65/1073 370/352 |
| 2017/0063977 | A1 * | 3/2017 | Jalwadi | H04L 65/403 |
| 2022/0311822 | A1 * | 9/2022 | Nord | H04L 63/0435 |
| 2022/0360589 | A1 * | 11/2022 | Muscariello | H04L 9/0836 |
| 2022/0368729 | A1 * | 11/2022 | Samain | H04L 65/103 |
| 2023/0102966 | A1 * | 3/2023 | Barnes | H04L 9/0866 380/284 |
| 2023/0188509 | A1 * | 6/2023 | Artemov | H04L 63/0428 713/168 |
| 2023/0198749 | A1 * | 6/2023 | Tolba | H04L 12/1818 380/278 |
| 2023/0254313 | A1 * | 8/2023 | Powell | H04L 63/101 713/150 |
| 2023/0283636 | A1 * | 9/2023 | Roques | H04L 63/065 709/223 |
| 2023/0291679 | A1 * | 9/2023 | Grassi | H04L 45/42 |
| 2023/0396658 | A1 * | 12/2023 | Circosta | H04L 63/102 |
| 2024/0089096 | A1 * | 3/2024 | Booth | H04L 9/088 |
| 2024/0223621 | A1 * | 7/2024 | Samain | H04L 65/403 |
| 2025/0167987 | A1 * | 5/2025 | Hashimoto | H04L 9/16 |
| 2025/0202691 | A1 * | 6/2025 | Barnes | H04L 9/0836 |
| 2025/0211436 | A1 * | 6/2025 | Livshits | H04L 9/088 |
| 2025/0247390 | A1 * | 7/2025 | Barnes | H04L 63/0876 |
| 2026/0081785 | A1 * | 3/2026 | Barnes | H04L 9/3242 |
| 2026/0113359 | A1 * | 4/2026 | Friel | H04L 63/205 |

OTHER PUBLICATIONS

Wire, "The Platform for Confidential Communication," Simply the Most Secure Messenger!, Retrieved from: https://wire.com/en/product, on Sep. 30, 2024, 9 pages.

* cited by examiner

300

1100

MESSAGING LAYER SECURITY (MLS) FOR UNVERIFIED PARTICIPANTS

CROSS REFERENCE TO RELATED APPLICATION

This application claims priority to U.S. Application No. 63/708,864, filed Oct. 18, 2024, the entirety of which is incorporated herein by reference.

TECHNICAL FIELD

The present disclosure relates to communications using the Messaging Layer Security (MLS) protocol.

BACKGROUND

Messaging Layer Security (MLS) enables a group of clients to verify each other's identities, use these verified identities as the basis for establishing cryptographic keys that are shared within the group of clients, and use these cryptographic keys for communicating securely within the group. Currently, users of legacy clients that do not support MLS cannot participate in MLS groups. In addition, collaboration services that involve access to unencrypted media cannot participate in MLS groups.

DESCRIPTION OF EXAMPLE EMBODIMENTS

Overview

Figure 1:
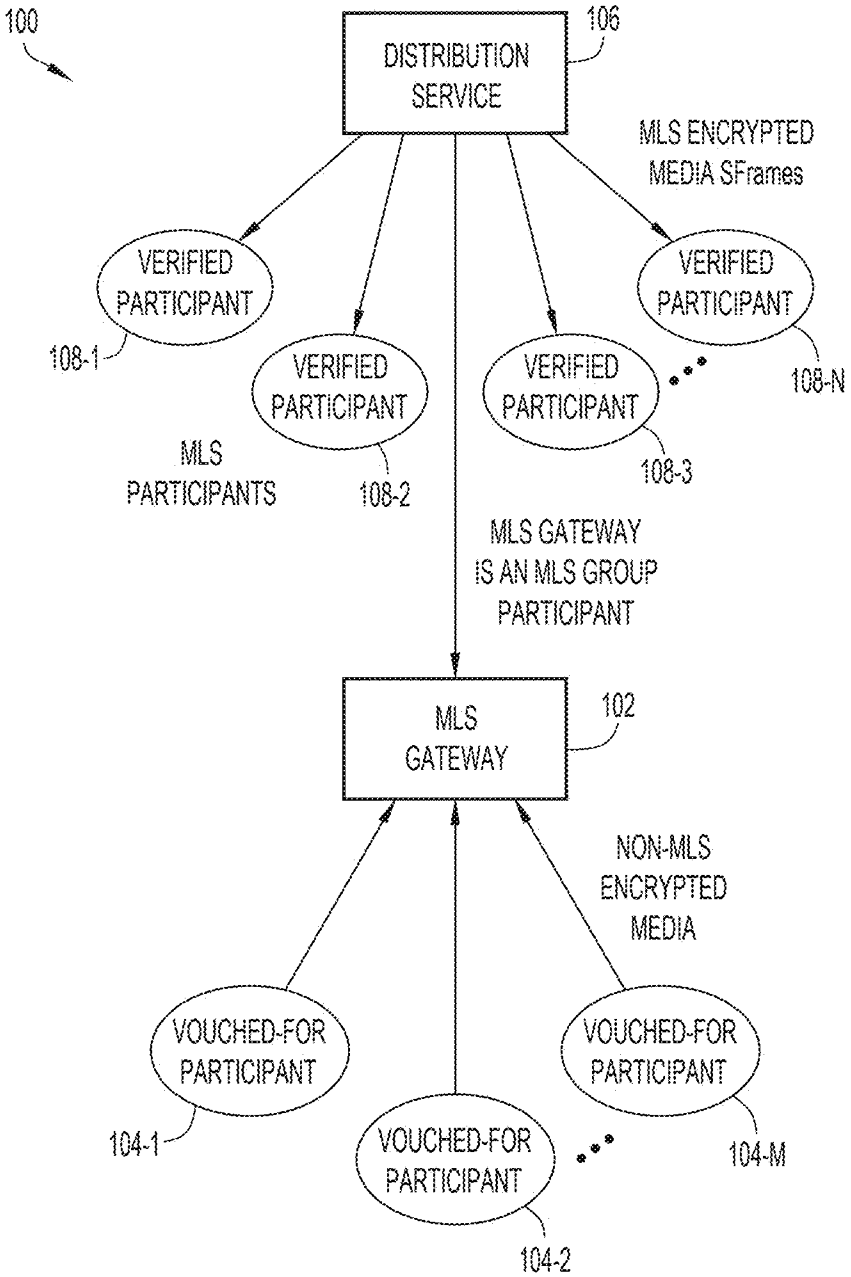
FIG. 1 is a block diagram of an environment in which an MLS gateway is provided to support communications between non-MLS capable participants and a MLS group, according to an example embodiment.

In one embodiment, a method is presented to enable an MLS gateway to act on behalf of one or more vouched-for non-MLS capable participants in an MLS group. The method includes joining, by a Messaging Layer Security (MLS) gateway, an MLS group as a first verified member of the MLS group for secure messaging among participants of the MLS group. The MLS gateway transmits first secure content obtained from a first participant to one or more second participants of the MLS group. The first participant is a non-MLS capable participant, and the one or more second participants of the MLS group are verified MLS capable participants. The MLS gateway further transmits second secure content obtained from the one or more second participants of the MLS group to the first participant.

EXAMPLE EMBODIMENTS

MLS enables a group of clients (e.g., collaboration application clients, collaboration devices, Internet Protocol (IP) phones, etc.) to verify each other's identities, use these verified identities as the basis for establishing cryptographic keys that are shared within the group of clients, and use these cryptographic keys for communicating securely within the MLS group. MLS protocol messages and encrypted communications media/data are transported via an MLS Distribution Service (DS), and the DS (e.g., a collaboration server) cannot access the cryptographic keys or unencrypted media/data.

Users using legacy clients (e.g., older IP phones or older video devices, users dialing in over a Public Switched Telephone Network (PSTN), analog devices connected to an analog telephone adapter (ATA), etc.) that do not support MLS cannot participate in MLS groups (e.g., MLS enabled collaboration sessions). In addition, collaboration services that involve access to unencrypted media cannot participate in MLS groups. For example, some collaboration services, such as recording, transcription, translation, compliance, etc., cannot be performed without breaking MLS security.

Users of cloud collaboration services desire the security that MLS end-to-end encryption (E2EE) offers. However, some users also want to use their older legacy clients that do not support MLS while benefitting from MLS E2EE encryption and server-side features such as recording, transcription, and PSTN breakout.

According to embodiments described herein, an organization may use an MLS gateway to vouch for the identity of non-MLS capable clients and server components. Using an MLS gateway enables legacy non-MLS capable clients to join MLS encrypted calls and meetings, and send and receive messages securely in the MLS encrypted calls and meetings. Using an MLS gateway also enables an organization to deploy trusted components on-premise to enable server-based features (e.g., recordings, transcripts, translations, summaries, etc.) and to join Software-as-a-Service (SaaS) hosted calls and meetings without breaking MLS E2EE encryption.

For example, according to embodiments described herein, an MLS gateway may join an E2EE cloud-based call or meeting and act on behalf of legacy IP phones and video devices to allow users of the legacy devices to participate in the E2EE cloud-based calls and meetings. In addition, according to techniques described herein, a user of a legacy (or non-MLS capable) device may use an MLS gateway to deploy on-premise server components to record, transcribe, summarize, etc., E2EE cloud-based calls and meetings without breaking the E2EE security promise.

As discussed above, MLS enables a group of clients to verify each other's identities, use these verified identities as the basis for securely establishing cryptographic keys that are shared within an MLS group, and use the cryptographic keys for communicating securely within the group. The MLS protocol defines the messages for carrying out these operations. Clients exchange MLS protocol messages via a delivery or distribution service. The distribution service does not have access to the cryptographic keys.

Some meeting services support the use of MLS encryption. Clients that support MLS for meetings can join a cloud-based meeting where all media is MLS encrypted. The clients may verify the identity of all other end users in the meeting. Currently, if a non-MLS capable client joins the meeting, or if the meeting is recorded, MLS encryption is turned off and the meeting reverts to standard media encryption.

Some cloud-based or online calling services may support the use of MLS encryption. When using these cloud-based/online calling services, clients that support MLS for calling may place a 1:1 cloud-based call in which all media is MLS encrypted. MLS encryption is turned off and the call reverts to standard media encryption as appropriate based on feature invocations (e.g., transferring a call to a non-MLS capable user, recording the call using a recording mechanism, etc.).

Embodiments described herein provide for an MLS gateway that is a verified participant in an MLS group. The MLS gateway can vouch for the identity of, and act on behalf of, multiple participants that logically sit behind it. The participants may be end users using client applications, or may be server based components. The underlying security principal with MLS is that the organization, or group of users, using MLS clients has full control over and trusts the MLS clients to not divulge encryption keys or unencrypted content to the distribution service.

FIG. 1 illustrates an example environment 100 in which an MLS gateway acts on behalf of a plurality of non-MLS enabled participants in an MLS group. Environment 100 includes Distribution Service (DS) 106, verified participants 108-1, 108-2, 108-3, . . . , 108-N, MLS gateway 102, and vouched-for participants 104-1, 104-2, . . . , 104-M.

Verified participants 108-1 . . . 108-N are MLS-capable participants who have directly joined an MLS group using their own verified identities. MLS gateway 102 is a verified participant. Vouched-for participants 104-1 to 104-M are participants that sit behind MLS gateway 102, and MLS gateway 102 vouches for these participants and acts on behalf of these participants in connection with interactions in the MLS group. Vouched-for participants 104-1 to 104-M are participants using non-MLS capable devices. Examples of vouched-for participants 104-1 to 104-M include, but are not limited to, users using legacy non-MLS capable clients (e.g., older IP phones, older video devices, analog devices connected to an ATA, users calling in over PSTN, etc.) and server components that need access to media (e.g., recording, transcription, translation services, etc.). Therefore, the vouched-for participants 104-1 to 104-M may be end users or server components.

The goal of MLS is to facilitate use of a distribution service, such as DS 106, which is typically hosted by a SaaS provider, for encrypted content exchange. In some embodiments, such as in the example illustrated in FIG. 1, the DS 106 may include functionalities of, for example, a collaboration service or services (e.g., online meetings, calling, contact center, etc.). In other embodiments, the DS 106 may be separate from a collaboration service. The DS 106 does not have access to the encryption keys, and thus never has access to the decrypted content. The assumption is that the organizations that use the DS 106 have control over and trust the MLS clients that participate in MLS groups, and know the clients will never divulge encryption keys or unencrypted content to the DS SaaS provider.

In the example illustrated in FIG. 1, DS 106 exchanges MLS encrypted media Secure Frames (SFrames) with members of the MLS group (e.g., verified participants 108-1 to 108-N and MLS gateway 102). Verified participants 108-1 to 108-N and MLS gateway 102 are MLS capable clients and are, therefore, able to perform MLS operations associated with encrypting and decrypting data exchanged in the MLS group. The MLS gateway 102 exchanges non-MLS encrypted media with vouched-for participants 104-1 to 104-M. Vouched-for participants 104-1 to 104-M are non-MLS capable clients and are unable to perform MLS operations. Information exchanged between vouched-for participants 104-1 to 104-M may be encrypted in a different manner or may not be encrypted.

Figure 9:
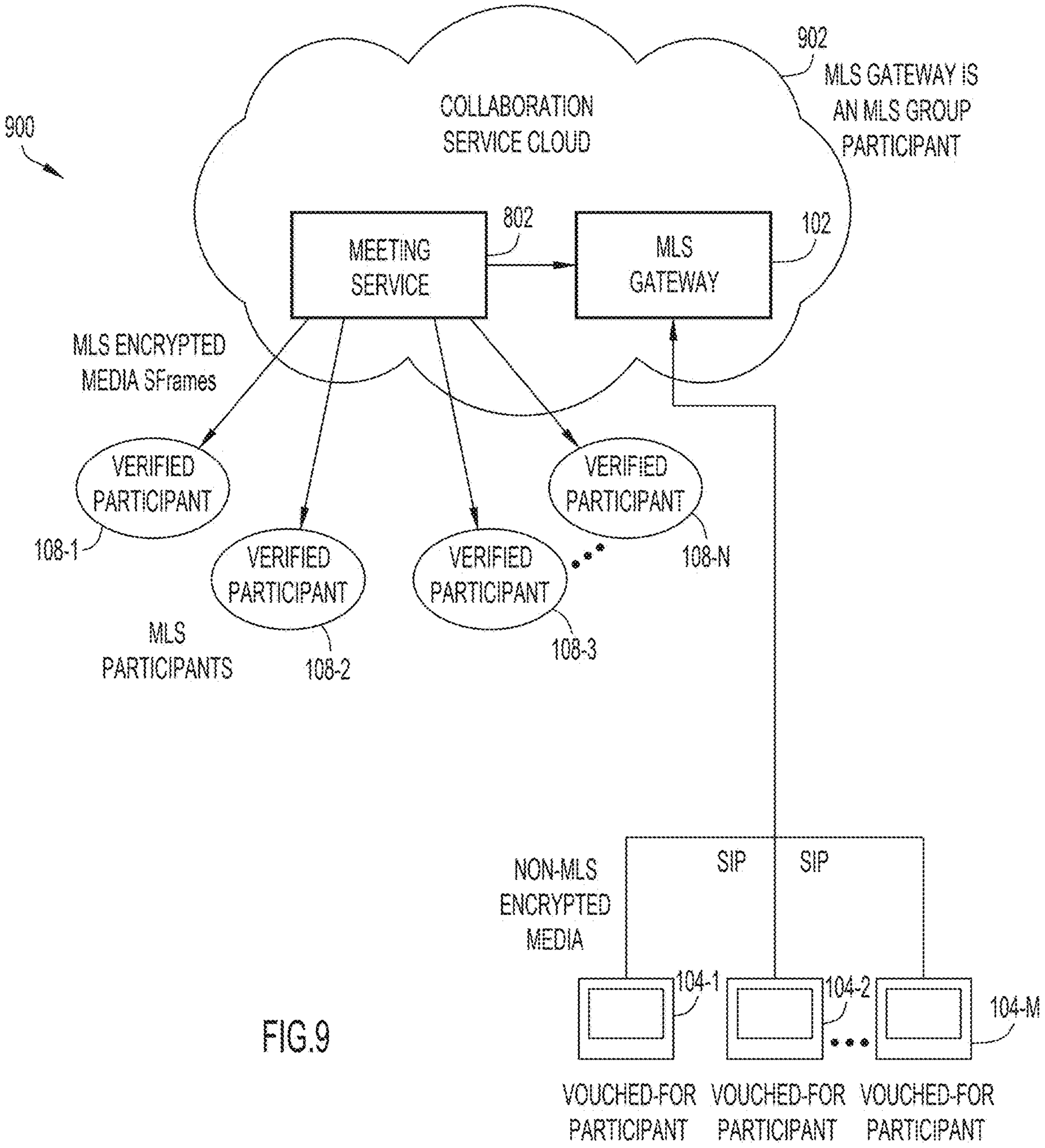
FIG. 9 is a block diagram illustrating an example in which an MLS gateway is deployed in a communication service cloud, according to an example embodiment.

There are two models for deploying an MLS gateway—an on-premise MLS gateway and a DS MLS gateway. The MLS gateway 102 illustrated in FIG. 1 is an on-premise MLS gateway that is deployed in the network of a customer of DS 106. An on-premise MLS gateway is fully controlled by the customer of the DS 106 and is not controlled by an operator of the DS. A DS MLS gateway is deployed in the DS network and the DS MLS gateway is under the control of the DS. An example of a DS MLS gateway is illustrated in FIG. 9. In some embodiments, both on-premise MLS gateways and DS operated MLS gateways may be in the same MLS group.

For on-premise MLS gateway deployments (as illustrated in FIG. 1), the organizations have control over and trust the on-premise MLS gateway 102, and know the MLS gateway clients will not divulge encryption keys or unencrypted content to the DS SaaS provider. The MLS gateway 102 may vouch for the identity of users and services behind it, with the user's clients and services typically being deployed in the organization's local network.

When using a DS MLS gateway, the MLS gateway is deployed in the DS network. Using a DS MLS gateway may enable legacy clients that are directly connected to the DS to participate in MLS groups with users of MLS-capable clients. When the MLS gateway is a DS MLS gateway, the DS will have access to MLS cryptographic keys, and will have a verified identity that is issued by a DS operator. Therefore, this model does not guarantee security of encrypted MLS content, as the DS has access to MLS cryptographic keys.

However, the DS MLS gateway model does still provide verified identity for verified participants in MLS groups. Therefore, verified participants will know that they are in an MLS group with all other verified participants (and have proof of the identities of these other participants), the DS-operated MLS gateway with the DS-assigned identity, and any participants behind the MLS gateway that are vouched for by the MLS gateway (which could include users on legacy non-MLS capable clients that are registered directly with the DS).

The verified participants will also know that the DS-operated MLS gateway has access to the MLS E2EE encryption keys. The verified participants have all the information they need, and can decide whether to trust the DS-operated MLS gateway and continue with communications within the MLS group. They may, for example, ask the vouched-for participants to drop from the group and rejoin the group directly from an MLS-capable client before continuing.

Returning to the example illustrated in FIG. 1, sensitive MLS protocol cryptographic data (such as encryption keys, key schedule, identity credentials (e.g. X.509 private keys)) may remain under control of the MLS gateway 102 and do not need to be shared with any backend vouched-for participants 104-1 to 104-M. Vouched-for participants 104-1 to 104-M behind the MLS gateway 102 can join MLS groups with verified participants 108-1 to 108-N. Vouched-for participants 104-1 to 104-M can engage in MLS group conversations, and (depending on implementation specific policies) can both send and receive content, and perform any operations that a verified participant can. All operations that vouched-for participants 104-1 to 104-M are allowed to perform (depending on implementation specific policy) are carried out by the MLS gateway 102 on behalf of the vouched-for participant. For example, the MLS gateway 102 may send an RFC9420 Add Proposal MLS message on behalf of a vouched-for participant if that participant wants to add another participant. The MLS gateway 102 will use its own identity to sign this message, and will include an indication that the MLS gateway 102 is acting on behalf of the vouched-for participant.

Figure 2:
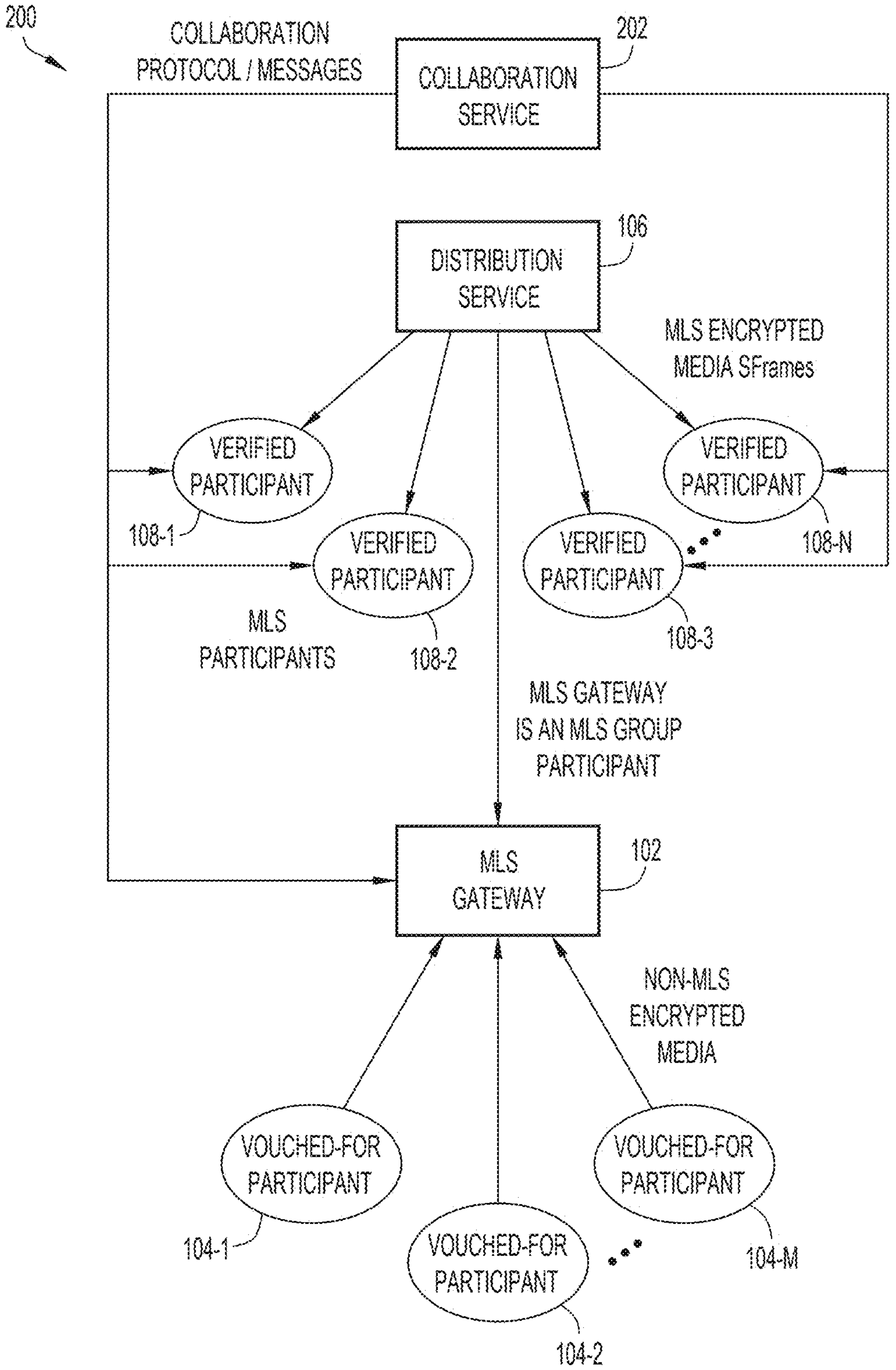
FIG. 2 is a block diagram of an environment in which an MLS gateway communicates with a collaboration service to enable communications between non-MLS capable participants and members of an MLS group in a collaboration session, according to an example embodiment.

Reference is now made to FIG. 2. FIG. 2 is a diagram illustrating an environment 200 in which the distribution service is separate from the collaboration service. Environment 200 includes a collaboration service 202, DS 106, an MLS gateway 102, verified participants 108-1 to 108-N, and vouched-for participants 104-1 to 104-M clients sitting behind the MLS gateway 102.

In the example illustrated in FIG. 2, DS 106 is an MLS DS. Environment 200 is configured such that the group of users or the organization using the DS 106 and collaboration service 202 trust their MLS-capable clients (e.g., verified participants 108-1 to 108-N) to never divulge encryption keys or unencrypted media to the DS 106 or collaboration service 202. In addition, the users trust the MLS gateway 102 to never divulge encryption keys or unencrypted media to the DS 106 or collaboration service 202. The users trust that the MLS gateway 102 will only act on behalf of and vouch for authorized non-MLS capable participants (where the participants could be end users or server components). The users trust that the non-MLS capable participants (e.g., vouched-for participants 104-1 to 104-M) will never divulge encryption keys (if they have access to them) or unencrypted media to the DS 106 or collaboration service 202.

SaaS collaboration services typically use a microservice architecture. For MLS capable SaaS services, there could be, for example, one or more microservices providing MLS distribution service functionality. In the example illustrated in FIG. 2, there could be one or more microservices providing general collaboration services (e.g., meetings, calling, contact center, etc.). In another example, the DS 106 could be deeply integrated with and logically the same as the collaboration service 202.

As discussed above with respect to FIG. 1, verified participants 108-1 to 108-N use MLS-capable clients to join MLS groups. In the example illustrated in FIG. 2, MLS capable clients may exchange control/protocol messages bidirectionally with the collaboration service 202 and the DS 106. Similarly, the MLS gateway 102 may exchange control/protocol messages bidirectionally with the collaboration service 202 and the DS 106 because the MLS gateway 102 is a verified member of the MLS group.

When the MLS gateway 102 has been added to an existing MLS group, the MLS gateway 102 may act on behalf of vouched-for participants 104-1 to 104-M. To act on behalf of the vouched-for participants 104-1 to 104-M, the MLS gateway 102 may forward media bidirectionally from the MLS-capable verified participants 108-1 to 108-N to services and/or vouched-for participants 104-1 to 104-M.

As discussed above, vouched-for participants 104-1 to 104-M may be end users or server components. In addition to acting on behalf of vouched-for participants 104-1 to 104-M in the MLS group when the vouched-for participants 104-1 to 104-M are end user client devices, the MLS gateway 102 may allow premise server components to participate in MLS group and provide server-based features when the vouched-for participants 104-1 to 104-M are server components. The server-based features may include, for example, media recording, live call/meeting transcripts, live call/meeting translations, audio/video mixing, sentiment analysis, summarization, background noise removal, etc.

With the embodiments described herein, the same underlying security principal for MLS clients holds true for the MLS gateway 102. The organization, or group of users, has full control over and trusts the MLS gateway 102 to not divulge encryption keys or unencrypted content to the DS 106. Furthermore, the organization, or group of users, trusts that the MLS gateway 102 will vouch for only authorized participants that logically sit behind it, and will not vouch for unauthorized users or services. In some embodiments, an organization administrator may control the configuration of MLS gateway 102, and may control which users and services behind the MLS gateway 102 that the MLS gateway 102 may act on behalf of and vouch for.

In some embodiments, multiple MLS gateways may join an MLS group. For example, an organization with multiple locations or sites may have an MLS gateway 102 per site, or multiple MLS gateways 102 per site. For example, a collaboration service customer may have multiple sites with a communications manager deployed, have users on legacy IP phones connected to the communications managers, and additionally have PSTN connections on each site. Users of the communications managers and PSTN dial-in users may join a cloud-based MLS meeting and have the respective site MLS gateway 102 vouch for their identities.

To work on behalf of vouched-for participants 104-1 to 104-M, MLS gateway 102 is first added to an existing MLS group. There are several ways in which the MLS gateway 102 may be added to an existing MLS group. In a first option, the collaboration service 202 may send a message to the MLS gateway 102 instructing the MLS gateway 102 to send an MLS protocol message requesting that it be added to the group and an existing verified participant may confirm this operation using their MLS-capable client.

Figure 3:
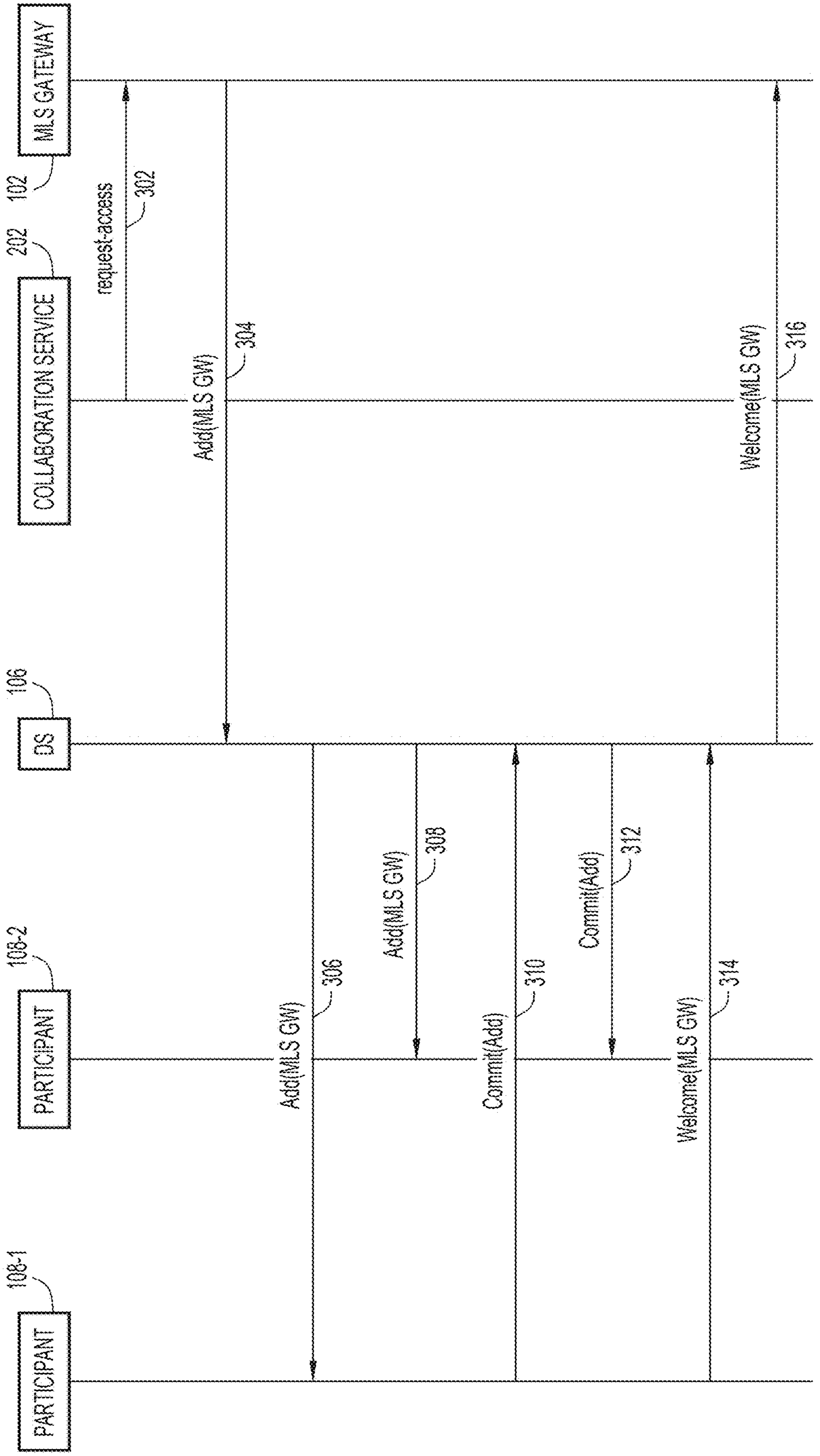
FIG. 3 is a messaging diagram illustrating an example in which a collaboration service instructs an MLS gateway to request access to a collaboration session, according to an example embodiment.

Reference is now made to FIG. 3. FIG. 3 is a messaging diagram illustrating an example method 300 in which a collaboration service 202 instructs the MLS gateway 102 to request access to an MLS group. In the example illustrated in FIG. 3, the collaboration service 202 identifies a need for the MLS gateway 102 to be included in the MLS group. At 302, the collaboration service 202 instructs the MLS gateway 102 to join the MLS group using any suitable mechanism or protocol. The MLS gateway executes the same protocol as an MLS-capable client to join the group. In particular, at 304, MLS gateway 102 sends a request to DS 106 to add the MLS gateway 102 to the MLS group.

At 306 and 308, DS 106 transmits Add(MLS GW) messages to verified participant 108-1 and 108-2, respectively, indicating that MLS gateway 102 is requesting to be added as a participant in the MLS group. At 310, verified participant 108-1 transmits a Commit message to DS 106 indicating that MLS gateway 102 may be added as a member of the MLS group. At 312, DS 106 transmits a message to verified participant 108-2 indicating that the Commit message adding the MLS gateway 102 as a member has been received and accepted. At 314, verified participant 108-1 transmits a Welcome message indicating that MLS gateway 102 has been added as member of the MLS group and, at 316, the Welcome message is forwarded to MLS gateway 102. The MLS gateway 102 accepts the Welcome message and joins the MLS group.

Figure 4:
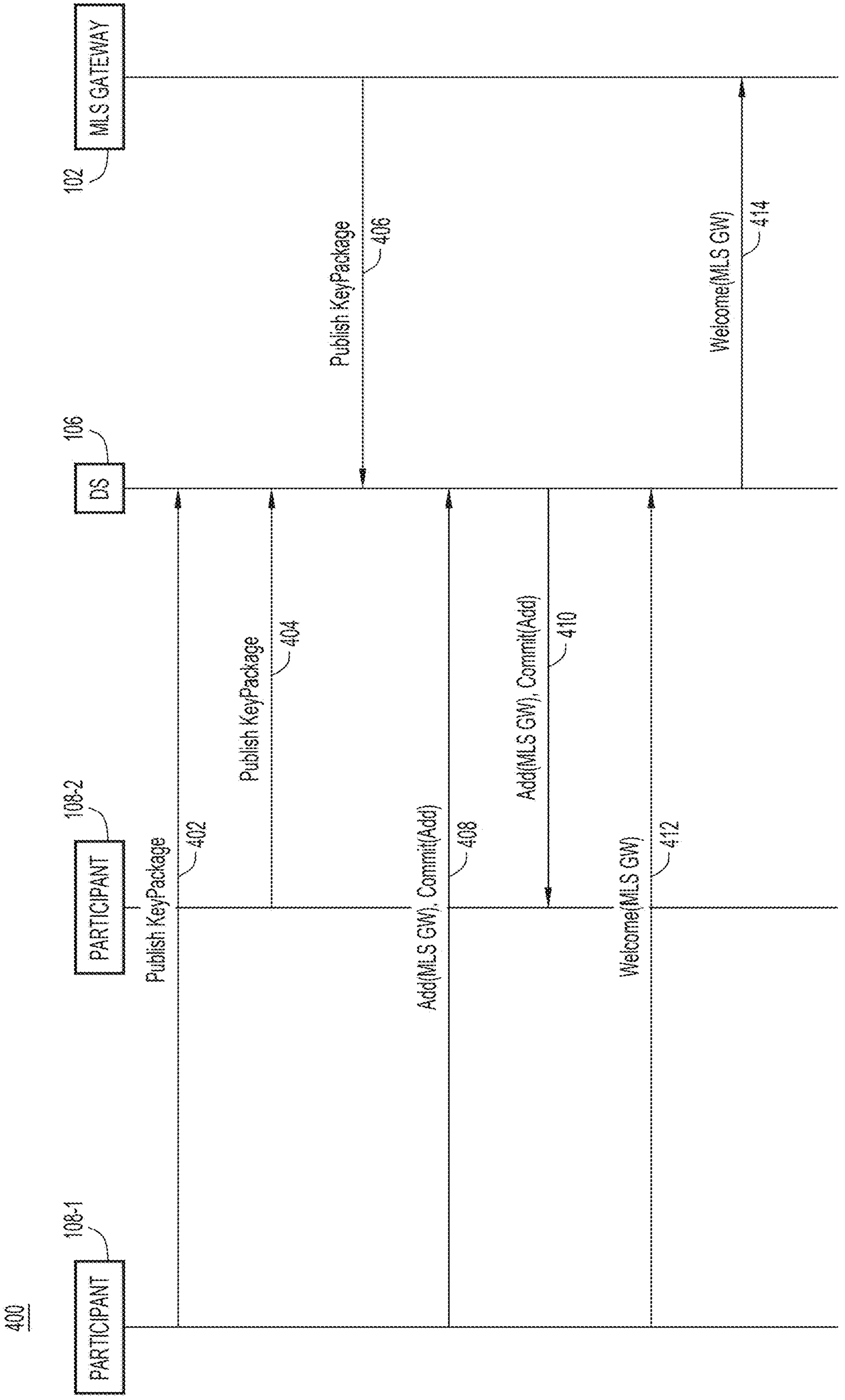
FIG. 4 is a messaging diagram illustrating an example in which an MLS group participant adds an MLS gateway to the MLS group, according to an example embodiment.

Reference is now made to FIG. 4, which illustrates a second option for adding an MLS gateway to an MLS group. FIG. 4 is a message sequence diagram illustrating an example method 400 in which an existing MLS group participant adds the MLS gateway 102 to an MLS group.

In the example illustrated in FIG. 4, at 402, 404, and 406, verified participant 108-1, verified participant 108-2, and the MLS gateway 102, respectively, each publishes its KeyPackage to the DS 106 so that other MLS clients can discovery the KeyPackage (as per the procedures of RFC 9420 Section 3.2).

In this example, verified participant 108-1 identifies a need for the MLS gateway 102 to be included in the MLS group. The verified participant 108-1 uses their MLS-capable client to add the MLS gateway 102 to the group using the same MLS protocol messages as would be used to add any other participant. In particular, at 408, verified participant 108-1 sends an Add and Commit message to DS 106 to add the MLS gateway 102 to the MLS group. At 410, DS 106 sends a message to the other verified participant 108-2 that the Add and Commit messages have been received and accepted. At 412, verified participant 108-1 sends a Welcome message and at 414, the Welcome message is forwarded to MLS gateway 102. The MLS gateway 102 executes the same protocol as an MLS-capable client to accept the invitation (e.g., the MLS Welcome message) and join the MLS group.

Once an MLS gateway 102 is added to an MLS group, the MLS gateway 102 may add one or more vouched-for participants 104-1 to 104-M. The MLS gateway 102 acts on behalf of the vouched-for participants 104-1 to 104-M in MLS groups. There are multiple options for how an MLS gateway 102 represents participants in an MLS group.

In a first option, the MLS gateway 102 may join an MLS group once only, and the MLS gateway 102 acts on behalf of all vouched-for participants 104-1 to 104-M that are behind it. Other MLS group participants (e.g., verified participants 108-1 to 108-N) will see that the MLS gateway 102 has joined the group once.

Figure 5:
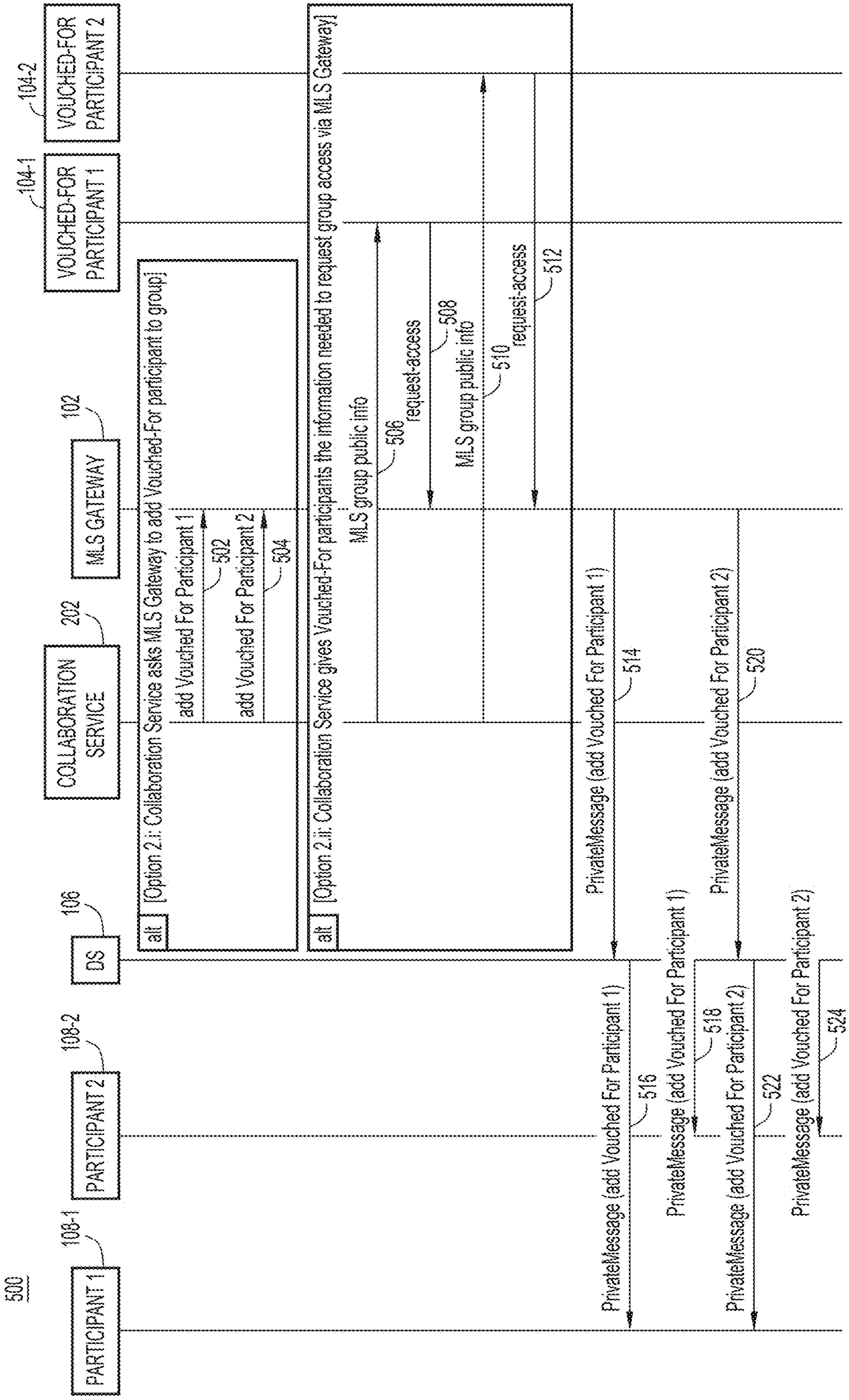
FIG. 5 is a messaging diagram illustrating an example in which an MLS gateway joins an MLS group one time, according to an example embodiment.

Reference is now made to FIG. 5. FIG. 5 is a message sequence diagram illustrating an example method 500 in which an MLS gateway 102 joins an MLS group one time. In this example, the MLS gateway 102 may act on behalf of a single vouched-for participant (e.g., vouched-for participant 104-1) or multiple vouched-for participants (e.g., vouched-for participants 104-1 and 104-2) at the same time.

As illustrated in FIG. 5, the MLS gateway 102 gets notified to add vouched-for participants to an MLS group. In a first option, the collaboration service 202 may ask the MLS gateway 102 to add the vouched-for participants to the MLS group. For this option, at 502 and 504, collaboration service 202 transmits messages to MLS gateway 102 requesting that MLS gateway 102 add vouched-for participant 104-1 and vouched-for participant 104-2, respectively, to the MLS group (e.g., that MLS gateway 102 will act on behalf of vouched-for participants 104-1 and 104-2 in the MLS group).

In a second option, the collaboration service 202 may give vouched-for participants 104-1 and 104-2 information needed to request access to the MLS group via the MLS gateway 102. For this option, at 506, collaboration service 202 transmits public information associated with the MLS group to vouched-for participant 104-1 and, at 508, vouched-for participant 104-1 sends a message to MLS gateway 102 requesting access to the MLS group (e.g., using the received public information). In a similar manner, at 510, collaboration service 202 transmits public information associated with the MLS group to vouched-for participant 104-2 and, at 512, vouched-for participant 104-2 sends a message to MLS gateway 102 requesting access to the MLS group.

The MLS gateway 102 sends a suitably signed message (e.g. an MLS PrivateMessage) to the MLS-capable participants in the MLS group indicating that the MLS gateway 102 is acting on behalf of one or more vouched-for participants. The signed message payload includes relevant information about the identity of the vouched-for participant(s), and the operation being performed on behalf of the vouched-for participant(s). For example, the identity could be any suitable encoding of an email address, a Uniform Resource Identifier (URI), an E.164 number, etc. The operation could be, for example, 'add vouched-for participant to group,' 'remove vouched-for participant from group,' 'vouched-for participant is proposing to add other participant to group,' etc. The MLS gateway may include information about one or more vouched-for participants in the signed message.

In particular, at 514, MLS gateway 102 sends a PrivateMessage to DS 106 indicating that MLS gateway 102 is acting on behalf of vouched-for participant 104-1. At 516 and 518, DS 106 transmits a Private Message to verified participants 108-1 and 108-2, respectively, indicating that MLS gateway 102 is acting on behalf of vouched-for participant 104-1. Similarly, at 520, MLS gateway 102 sends a PrivateMessage to DS 106 indicating that MLS gateway is acting on behalf of vouched-for participant 104-2. At 522 and 524, DS 106 transmits a PrivateMessage to verified participants 108-1 and 108-2, respectively, indicating that MLS gateway 102 is acting on behalf of vouched-for participant 104-2.

In this way, each verified participant in the MLS group is aware of the vouched-for participants participating in the MLS group (via the MLS gateway 102) and receives necessary information associated with the vouched-for participants.

In a second option, the MLS gateway 102 may join an MLS group once per vouched-for participant 104, and each MLS gateway 102 appearance acts on behalf of only one vouched-for participant. Other MLS group participants will see that the MLS gateway 102 has joined the group once per vouched-for participant.

Figure 6A:
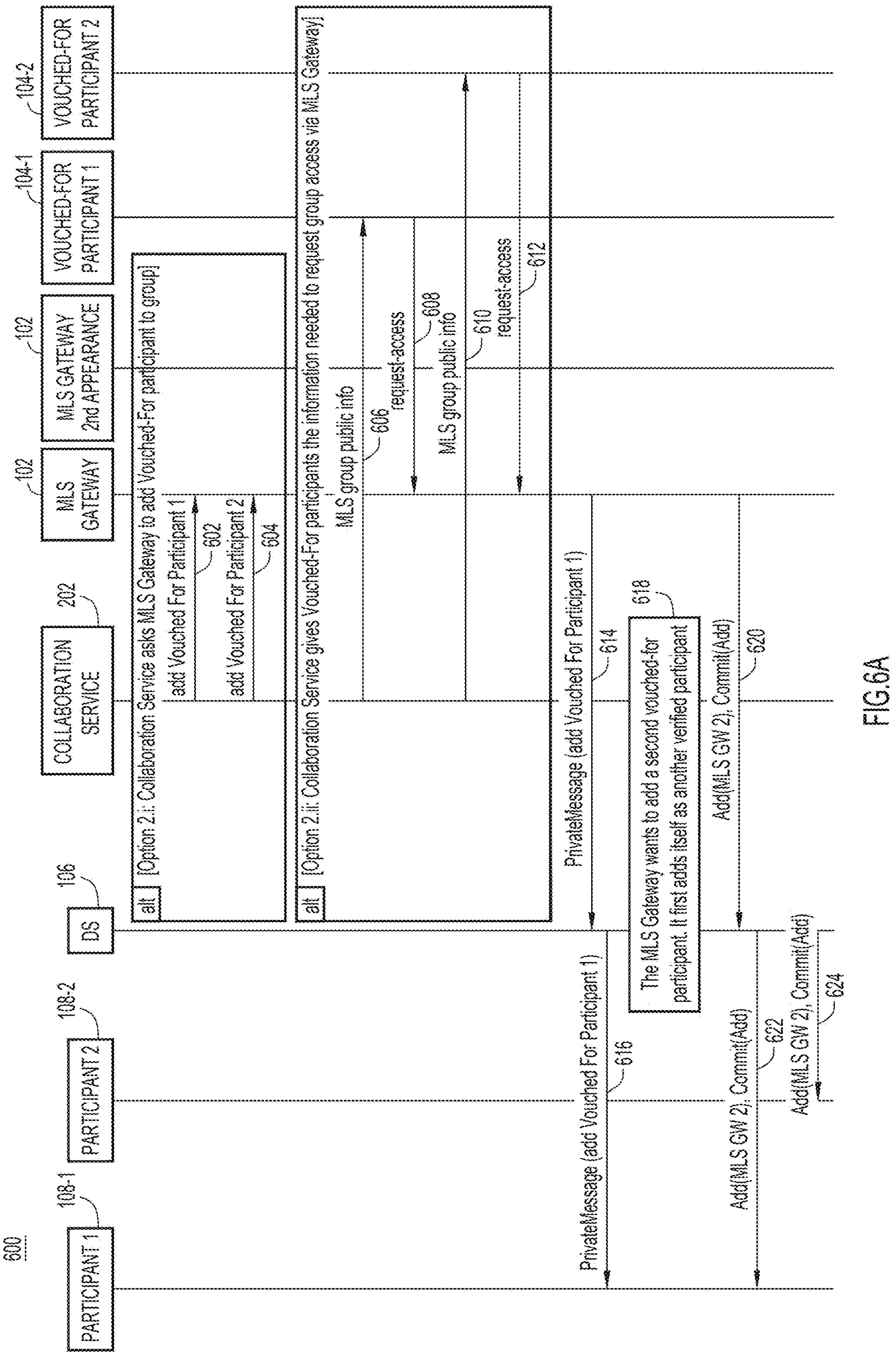
FIGS. 6A and 6B are messaging diagrams illustrating an example in which an MLS gateway joins an MLS group one time per vouched-for participant, according to an example embodiment.
Figure 6B:
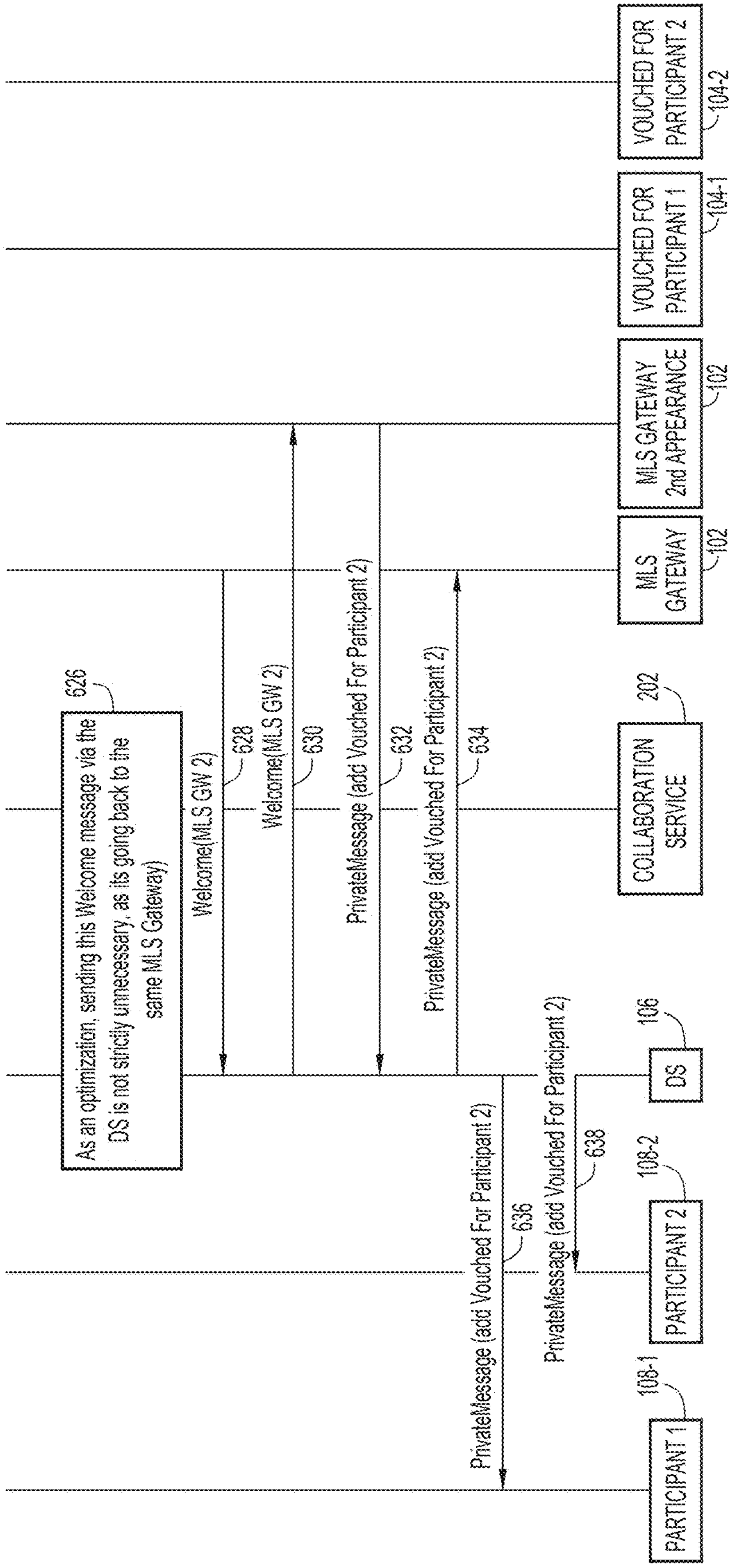

Reference is now made to FIGS. 6A and 6B. FIGS. 6A and 6B are message sequence diagrams illustrating an example method 600 in which an MLS gateway 102 joins an MLS group one time per vouched-for participant. The MLS gateway 102 may join the MLS group one time and act on behalf of a single vouched-for participant (e.g., vouched-for participant 104-1) or the MLS gateway 102 may join the MLS group multiple times, each time acting on behalf of a vouched-for participant (e.g., vouched-for participants 104-1 and 104-2). In the example illustrated in FIGS. 6A and 6B, the MLS gateway 102 may join an MLS group multiple times at the same time.

As illustrated in FIG. 6A, the MLS gateway is notified to add vouched-for participants to the MLS group. In a first option, the collaboration service 202 may ask the MLS gateway 102 to add the vouched-for participants to the MLS group. For this option, at 602 and 604, collaboration service 202 transmits messages to MLS gateway 102 requesting that MLS gateway 102 add vouched-for participant 104-1 and vouched-for participant 104-2, respectively, to the MLS group.

In a second option, the collaboration service 202 may give vouched-for participants 104-1 and 104-2 information needed to request access to the MLS group via the MLS gateway 102. For this option, at 606, collaboration service 202 transmits public information associated with the MLS group to vouched-for participant 104-1 and, at 608, vouched-for participant 104-1 sends a message to MLS gateway 102 requesting access to the MLS group (e.g., using the received public information). In a similar manner, at 610, collaboration service 202 transmits public information associated with the MLS group to vouched-for participant 104-2 and, at 612, vouched-for participant 104-2 sends a message to MLS gateway 102 requesting access to the MLS group.

For the first vouched-for participant that it adds (e.g., vouched-for participant 104-1), the MLS gateway 102 sends a suitably signed message (e.g., an MLS PrivateMessage) to all MLS-capable participants indicating that is acting on behalf of the vouched-for participant. The signed message payload includes relevant information about the identity of the vouched-for participant, and the operation being performed on behalf of that vouched-for participant. For subsequent vouched-for participants, the MLS gateway adds its own identity again to the MLS group. This is similar to a verified participant adding a second client to an MLS group (e.g., a user joins an MLS group using both their laptop client and mobile client). The MLS gateway using this new instance of its identity sends a suitably signed message to all MLS-capable participants indicating that it is acting on behalf of a new vouched-for participant.

In particular, at 614, MLS gateway 102 sends a PrivateMessage to DS 106 indicating that MLS gateway 102 is acting on behalf of vouched-for participant 104-1. At 616, DS 106 sends a PrivateMessage to verified participant 108-1 indicating that the MLS gateway 102 is acting on behalf of vouched-for participant 104-1. At 618, MLS gateway 102 adds itself as another verified participant of the MLS group in order to add another vouched-for participant (e.g., vouched-for participant 104-2) to the MLS group. At 620, MLS gateway 102 sends an Add and Commit message to DS 106 to add a second instance of MLS gateway 102 as a participant of the MLS group. At 622 and 624, DS 106 transmits the Add and Commit message to verified participant 108-1 and 108-2, respectively, indicating that a second instance of MLS gateway 102 is being added to the MLS group.

At 628, MLS gateway 102 may send a Welcome message to DS 106 to welcome the second instance of MLS gateway 102 and, at 630, DS 106 may transmit the Welcome message to the second instance of MLS gateway 102.

As illustrated in FIG. 6B, as indicated at 626, sending the Welcome message via DS 106 is not strictly necessary since the Welcome message will go back to the same MLS gateway 102 who sent the Welcome message. Regardless of whether the Welcome message is sent, the second instance of MLS gateway 102 has joined the MLS group.

At 632, the second instance of MLS gateway 102 sends a PrivateMessage to DS 106 indicating that the second instance of the MLS gateway 102 is acting on behalf of vouched-for participant 104-2. The DS 106 then forwards the PrivateMessage indicating that the second instance of the MLS gateway 102 is acting on behalf of vouched-for participant 104-2 to all participants of the MLS group. In particular, at 634, the PrivateMessage is forwarded to the first instance of the MLS gateway 102 and at 636 and 638, the PrivateMessage is forwarded to verified participant 108-1 and verified participant 108-2, respectively.

In this way, the MLS gateway may join the MLS group multiple times and act on behalf of multiple vouched-for participants. However, only one vouched-for participant is behind each instance of the MLS gateway in the MLS group.

Figure 7:
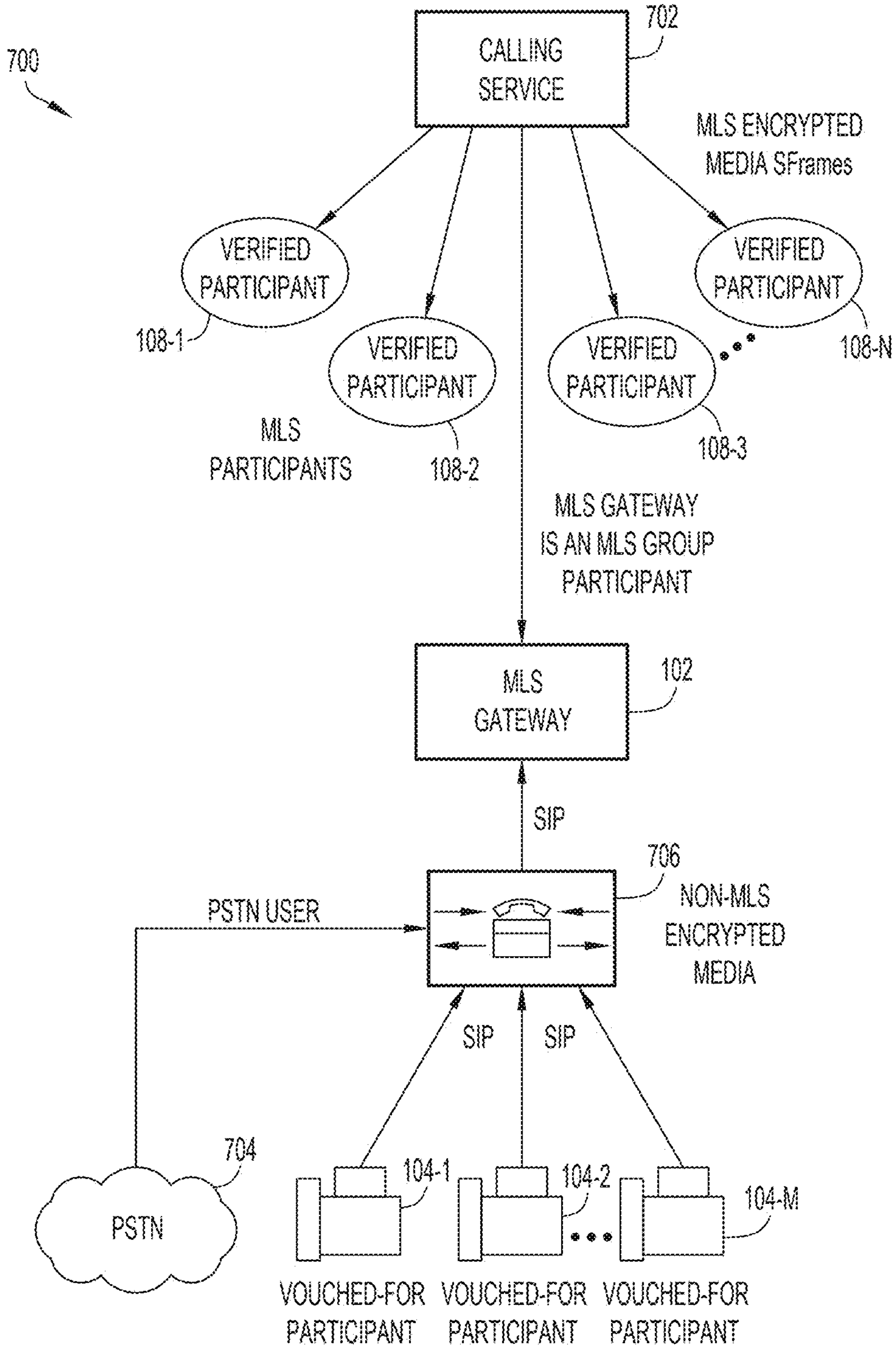
FIG. 7 is a block diagram illustrating an example in which an on-premise MLS gateway communicates with a calling service, according to an example embodiment.

Reference is now made to FIG. 7. FIG. 7 is a diagram of an environment 700 illustrating an example of cloud-based calling with an on-premise MLS gateway 102. Environment 700 includes calling service 702, verified participants 108-1 to 108-N, MLS gateway 102, calling management device 706, PSTN 704, and vouched-for participants 104-1 to 104-M.

In the example illustrated in FIG. 7, the MLS gateway 102 may vouch for the identity of users who dial in over PSTN (e.g., vouched-for participants 104-1 to 104-M). For example, the MLS gateway 102 may indicate that a user is dialing in using a specific E.164 Calling Line ID. Because a PSTN 704 is typically operated by third party service providers, and neither the DS 106 operator nor a customer of the DS 106 has operational control over the PSTN link, it is a policy decision for each customer or organization that operates whether to allow vouched-for PSTN participants to join MLS groups.

In this example, the MLS gateway 102 may enable users deployed on-premise to make MLS calls with users using cloud-based/online calling (e.g., users on legacy IP phones registered to a calling management service, users dialling in over premise connected PSTN, etc.). As discussed above, the MLS gateway 102 will vouch for the identity of any premise-based user that sits behind it.

In this example, the MLS gateway 102 shows up as the other participant in a 1:1 call with an MLS user (e.g., a verified participant 108-1 to 108-N) or as a participant in an N-Way call with more than one verified participant 108-1 to 108-N. The MLS gateway 102 may inform the MLS user who the on-premise speaker is for 1:1 calls, or the MLS gateway 102 may inform all other MLS users in an N-Way call who the premise speakers are.

The assumption is that all premise equipment (MLS gateway 102, calling management devices 706, etc.) is under full control of the enterprise administrator and is configured correctly. For example, it is assumed that the administrator has ensured that the MLS gateway 102 is presenting accurate premise user identity information, and the online calling service 702 or collaboration service cannot circumvent this. It is additionally assumed that the administrator has ensured that unauthorized premise users cannot join MLS groups via the MLS gateway 102. The administrator may choose to allow or block vouched-for PSTN dial-in users. In addition, it is assumed that the administrator has configured the cloud-based calling service to allow routing of calls to the MLS gateway.

In the example illustrated in FIG. 7, verified participants 108-1 to 108-N and MLS gateway 102 exchange MLS encrypted media (e.g., SFrames) with calling service 702. Vouched-for participants 104-1 to 104-M, users of PSTN 704, and legacy on-premise calling management device 706 exchange non-MLS encrypted media (e.g., Session Initiation Protocol (SIP) messages) with MLS gateway 102. However, the vouched-for participants 104-1 to 104-M and users of PSTN 704 may join the MLS group using MLS gateway 102 and may securely communicate with other participants in the MLS group using non-MLS capable devices.

Figure 8:
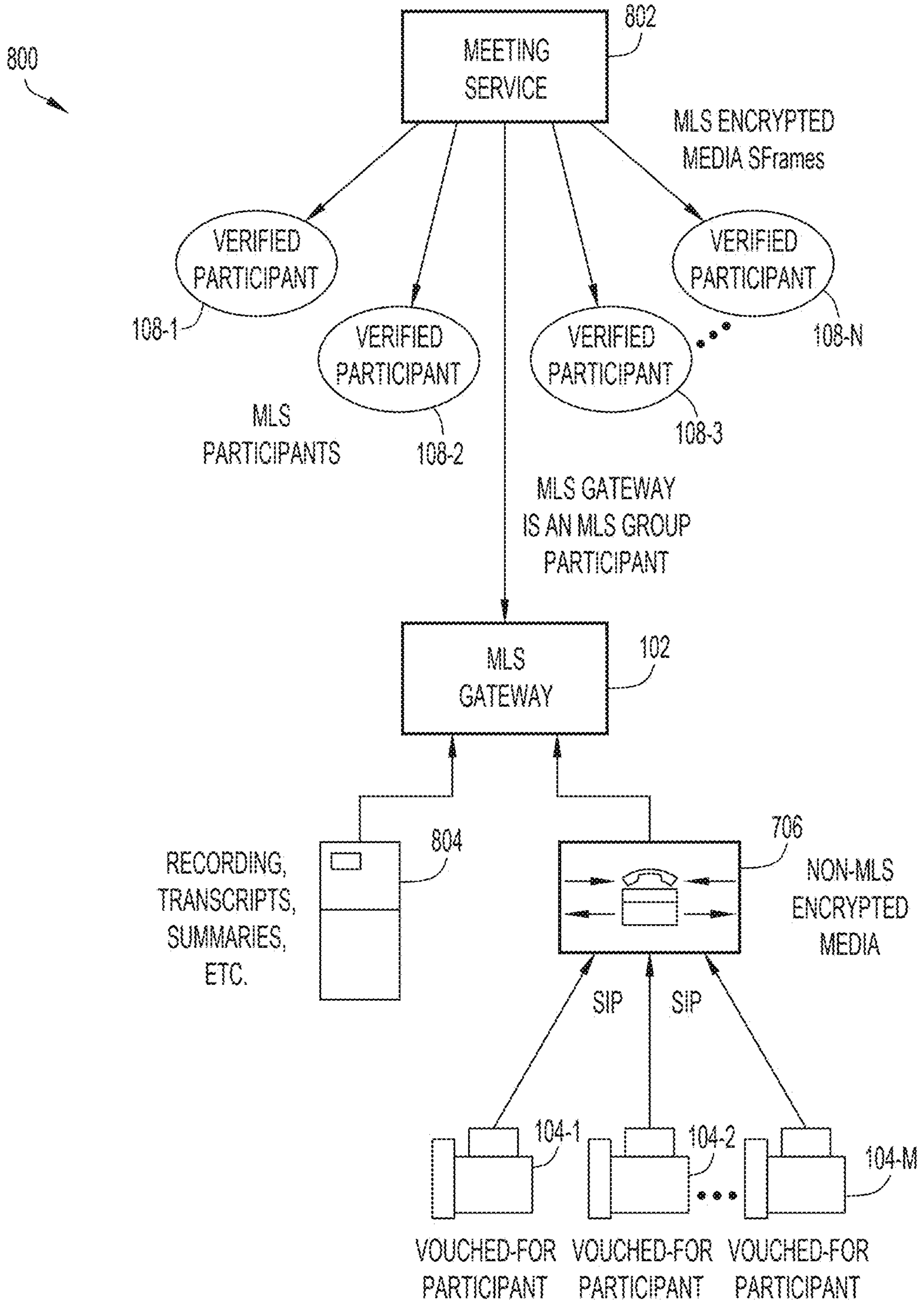
FIG. 8 is a block diagram illustrating an example in which an on-premise MLS gateway communicates with a meeting service, according to an example embodiment.

Reference is now made to FIG. 8. FIG. 8 is a diagram illustrating an example environment 800 in which an online meeting may be performed with an MLS gateway 102. Environment 800 includes meeting service 802, verified participants 108-1 to 108-N, MLS gateway 102, calling management device 706, and on-premise services 804.

In the example illustrated in FIG. 8, the MLS gateway 102 may enable vouched-for participants 104-1 to 104-N to perform collaboration services, such as recording meetings to on-premise storage (e.g., using on-premise services 804), allowing users on legacy premise endpoints (e.g., IP phones registered to a calling management service) to join the online meeting, and allowing meeting transcriptions and summaries to be performed by on-premise services 804, etc.

In these scenarios, meeting service 802 may host an online meeting and the MLS gateway 102 may appear as a verified participant in the online meeting. The MLS gateway 102 vouches for the identities of entities or users behind it as appropriate. In this example, MLS gateway 102 may vouch for vouched-for participants 104-1 to 104-M, who are accessing the online meeting using a calling management service. MLS gateway 102 may additionally vouch for on-premise services 804, which may include a server device or application that is responsible for performing services with respect to the online meeting (recording the meeting, transcribing the meeting, creating summaries of the meeting, etc.).

The same assumptions as for cloud-based or online calling using the MLS gateway 102 apply. For example, it is assumed that all premise equipment (MLS gateway 102, calling management devices 706, etc.) is under full control of the enterprise administrator and is configured correctly. For example, it is assumed that the administrator has ensured that the MLS gateway 102 is presenting accurate premise user and/or service identity information, and the online meeting or collaboration service cannot circumvent this. The recording, transcripts, summary, etc. scenarios are equally applicable to multiple types of cloud-based or online collaboration or other types of services (e.g., contact center services). In addition, dial-in PSTN users (e.g., vouched-for participants 104-1 to 104-M) may be allowed to participate in the online meeting.

As illustrated in FIG. 8, the MLS gateway 102 may enable non-MLS capable devices to participate in an online meeting and may additionally allow meeting functions (e.g., recording, transcriptions, etc.) to be performed by non-MLS capable devices (e.g., vouched-for participants 104-1 to 104-M) during the online meeting. Because the MLS gateway 102 vouches for the identity of participants (end user applications and/or server components) that logically sit behind it, non-MLS capable devices may fully participate in the online meeting and vouched-for server participants may perform operations typically performed by SaaS cloud services. In addition, the verified participants 108-1 to 108-N can be assured that all communications and services are secure because the participants behind the MLS gateway 102 are vouched for.

Reference is now made to FIG. 9. FIG. 9 is a diagram illustrating an example of an environment 900 in which online meetings are performed with a cloud-based/DS MLS gateway 102. Environment 900 includes collaboration service cloud 902, meeting service 802, MLS gateway 102, verified participants 108-1 to 108-N, and vouched-for participants 104-1 to 104-M.

In the example illustrated in FIG. 9, the MLS gateway 102 is deployed in a collaboration service cloud 902 and assigned a verified identity by the collaboration service. The MLS gateway 102 enables non-MLS capable legacy clients (e.g. old video devices), such as vouched-for participants 104-1 to 104-M, to join MLS groups and MLS E2EE encrypted meetings hosted by meeting service 802. Similar to the examples described above, the MLS gateway 102 vouches for the identity of the participants (e.g., vouched-for participants 104-1 to 104-M) behind it even when the MLS gateway 102 is deployed in a DS cloud, such as collaboration service cloud 902.

Because the collaboration service operated MLS gateway 102 has access to MLS encryption keys, deploying the MLS gateway 102 in the collaboration service cloud 902 breaks the E2EE content encryption key security guarantee. However, the configuration illustrated in FIG. 9 does provide customer benefits. For example, verified participants 108-1 to 108-N participating in the online meeting are still able to verify the identity of all other verified participants. Verified participants 108-1 to 108-N additionally may see that the collaboration service-based MLS gateway 102 is a participant and may see the identities that the MLS gateway 102 is vouching for (e.g., the identities of vouched-for participants 104-1 to 104-M). Furthermore, verified participants 108-1 to 108-N are able to choose whether to continue with the meeting, or request that all vouched-for participants 104-1 to 104-M drop and rejoin using MLS capable clients and, therefore, rejoin as fully verified participants.

Figure 10:
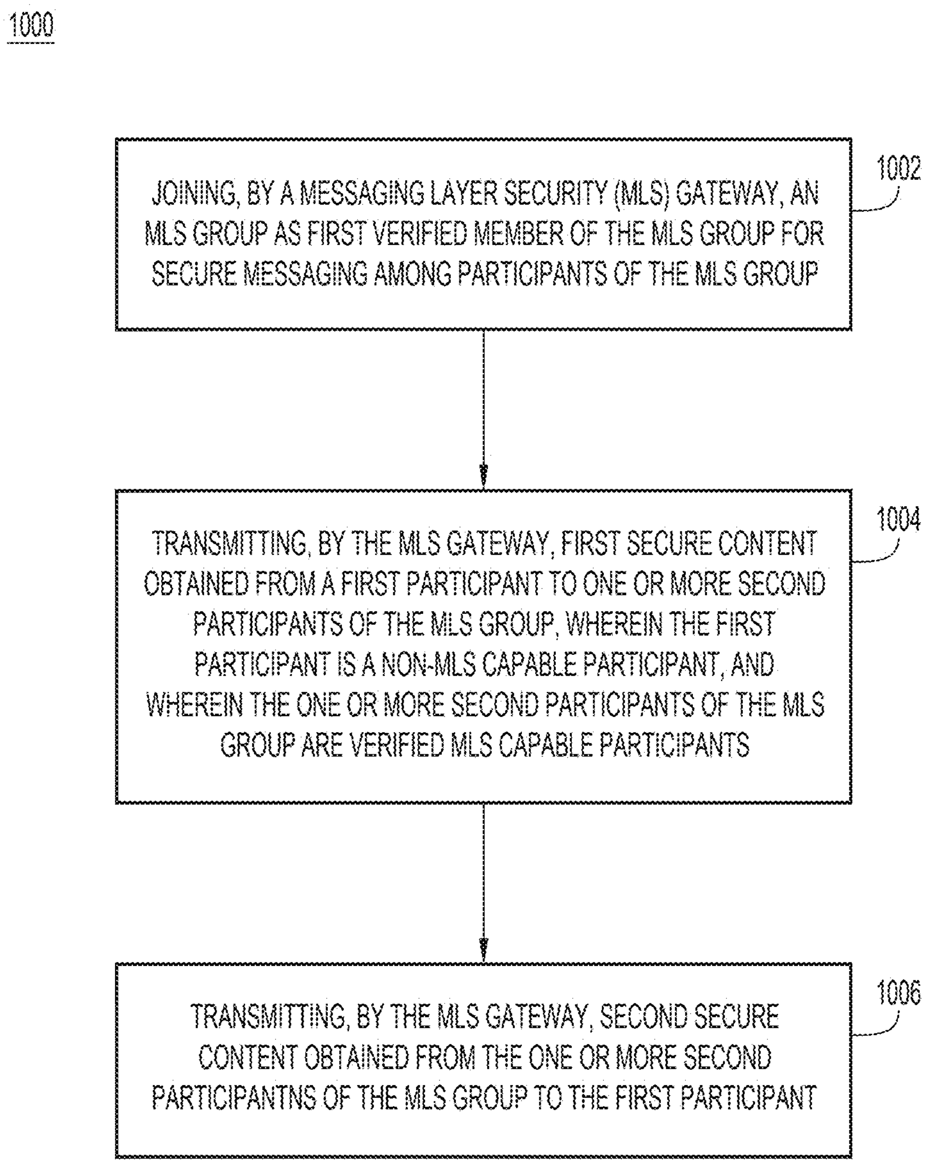
FIG. 10 is a flow diagram of a method in which an MLS gateway acts on behalf of a non-MLS capable device, according to an example embodiment.

Reference is now made to FIG. 10. FIG. 10 is a flow diagram of a method 1000 of using an MLS gateway to exchange secure communications among verified MLS capable participants of an MLS group and non-MLS capable participants. Method 1000 may be performed, for example, by MLS gateway 102 in conjunction with verified participants 108-1 to 108-N, vouched-for participants 104-1 to 104-M and other devices described herein with respect to FIGS. 1-5, 6A, 6B, and 7-9.

At 1002, an MLS gateway joins an MLS group as a first verified member of the MLS group for secure messaging among participants of the MLS group. At 1004, the MLS gateway may transmit first secure content obtained from a first participant to one or more second participants of the MLS group. The first participant is a non-MLS capable participant and the one or more second participants of the MLS group are verified MLS capable participants. For example, the MLS gateway may act on behalf of one or more non-MLS capable participants so that the one or more non-MLS capable participants may participate in the MLS group. The MLS gateway may obtain first content from a non-MLS capable participant, perform one or more MLS operations with respect to the first content (e.g., to produce MLS encrypted content), and forward the first content to one or more verified MLS capable participants of the MLS group.

At 1006, the MLS gateway may transmit second secure content obtained from the one or more second participants of the MLS group to the first participant. For example, the MLS gateway may receive MLS encrypted content from a verified MLS capable participant of the MLS group, perform one or more MLS operations on the MLS encrypted content (e.g., to decrypt the content), and forward the content to the one or more vouched-for non-MLS capable participants. In this way, the MLS gateway enables the non-MLS capable participants to participate in the MLS group.

As described herein, the MLS gateway is a member of an MLS group and has been added to the group via standard MLS mechanisms. The MLS gateway has a verified identity that other participants in the group can verify. In some embodiments, there may be one or more MLS gateways in an MLS group. The MLS gateway may join more than one MLS group.

The MLS gateway vouches for the identity of participants (end user applications or server components) that logically sit behind it. The MLS gateway acts on behalf of the vouched-for participants that sit behind it. Sensitive MLS protocol cryptographic data, such as encryption keys, key schedule, identity credentials (e.g. X.509 private keys) may remain under control of the MLS gateway and do not need to be shared with any backend vouched-for participants. When the MLS gateway performs an MLS protocol operation on behalf of or acts on behalf of a participant, it includes the identity of the vouched-for participant inside a signed MLS message, thus allowing other verified participants to verify that the MLS gateway trusts this vouched-for participant.

Depending on implementation specific policies, all operations that a verified participant can perform may be performed by the MLS gateway on behalf of vouched-for participants. For example, vouched-for participant Alice can propose that a verified participant Bob be added to an MLS group (i.e., Alice sits behind an MLS gateway and can request that the MLS gateway add user Bob to an MLS group, where Bob can join the MLS group as a verified participant). The MLS gateway will act on Alice's behalf and add Bob to the MLS group.

As another example, vouched-for participant Alice can propose that a vouched-for participant Charlie be added to an MLS group (i.e., Alice sits behind an MLS gateway and can request that the MLS gateway add user Charlie to an MLS group, where user Charlie also sits behind an MLS gateway, with that gateway acting on Charlie's behalf). The MLS gateway will act on Alice's behalf and add Charlie, who is behind an MLS gateway, to the MLS group.

Depending on implementation specific policies, the MLS gateway acting on behalf of vouched-for end user participants can facilitate all operations that verified participants can perform. This includes, but is not limited to, two-way real-time streaming of all media types (e.g., chat, audio, video, share, etc.) and feature invocations (e.g., call hold, transfer, conference, in-meeting chat, etc.).

The MLS gateway can enable vouched-for server participants to perform operations typically performed by SaaS cloud services. This includes, but it not limited to, media recording, live call/meeting transcripts, live call/meeting translations, audio/video mixing, sentiment analysis, call/meeting summarization, background noise removal, etc.

In some embodiments, the MLS gateway can join an MLS group once only, and then via application specific message content, send content on behalf of multiple vouched-for participants. Other verified participants will then see one instance of the MLS gateway identity in the MLS group, but application specific and/or UX logic could inform all other verified participants of the identities of all vouched-for participants.

In other embodiments, the MLS gateway could join an MLS group once per vouched-for participant. All other verified participants would then see the MLS gateway identity appear multiple times in the MLS group, with each instance of the MLS gateway representing one vouched-for participant. This is an implementation specific decision.

In summary, the MLS gateway acts on behalf of and can vouch-for non-MLS capable participants. The MLS gateway can act on behalf of and vouch for both end user clients and server components. The MLS gateway enables participants to use full bi-directional real time media streaming features across all media types. All verified participants in MLS groups have full visibility into the actions that the vouched-for participants perform. As all verified participants in MLS groups trust the MLS gateway, they can trust that all communications with the vouched-for non-MLS capable participants are secure.

Figure 11:
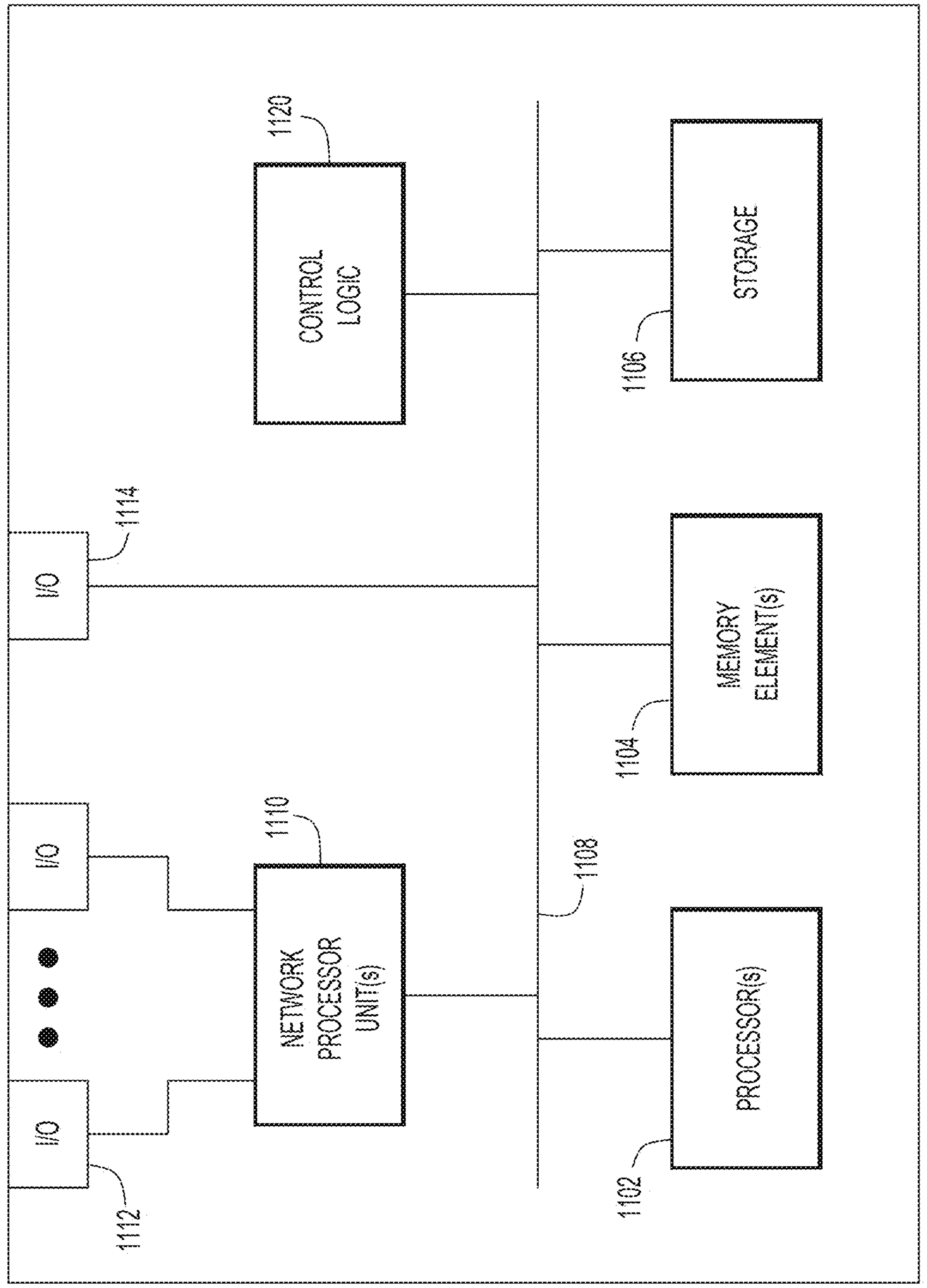
FIG. 11 is a block diagram of a device that may be configured to perform the techniques presented herein.

Referring to FIG. 11, FIG. 11 illustrates a hardware block diagram of a computing/computer device 1100 that may perform functions of an end device associated with operations discussed herein in connection with the techniques depicted in FIGS. 1-5, 6A, 6B, and 7-10. In various embodiments, a computing device, such as computing device 1100 or any combination of computing devices 1100, may be configured as any devices as discussed for the techniques depicted in connection with FIGS. 1-5, 6A, 6B, and 7-10 in order to perform operations of the various techniques discussed herein.

In at least one embodiment, the computing device 1100 may include one or more processor(s) 1102, one or more memory element(s) 1104, storage 1106, a bus 1108, one or more network processor unit(s) 1110 interconnected with one or more network input/output (I/O) interface(s) 1112, one or more I/O interface(s) 1114, and control logic 1120. In various embodiments, instructions associated with logic for computing device 1100 can overlap in any manner and are not limited to the specific allocation of instructions and/or operations described herein.

In at least one embodiment, processor(s) 1102 is/are at least one hardware processor configured to execute various tasks, operations and/or functions for computing device 1100 as described herein according to software and/or instructions configured for computing device 1100. Processor(s) 1102 (e.g., a hardware processor) can execute any type of instructions associated with data to achieve the operations detailed herein. In one example, processor(s) 1102 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1104 and/or storage 1106 is/are configured to store data, information, software, and/or instructions associated with computing device 1100, and/or logic configured for memory element(s) 1104 and/or storage 1106. For example, any logic described herein (e.g., control logic 1120) can, in various embodiments, be stored for computing device 1100 using any combination of memory element(s) 1104 and/or storage 1106. Note that in some embodiments, storage 1106 can be consolidated with memory element(s) 1104 (or vice versa), or can overlap/exist in any other suitable manner.

In at least one embodiment, bus 1108 can be configured as an interface that enables one or more elements of computing device 1100 to communicate in order to exchange information and/or data. Bus 1108 can be implemented with any architecture designed for passing control, data and/or information between processors, memory elements/storage, peripheral devices, and/or any other hardware and/or software components that may be configured for computing device 1100. In at least one embodiment, bus 1108 may be implemented as a fast kernel-hosted interconnect, potentially using shared memory between processes (e.g., logic), which can enable efficient communication paths between the processes.

In various embodiments, network processor unit(s) 1110 may enable communication between computing device 1100 and other systems, entities, etc., via network I/O interface(s) 1112 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 1110 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1100 and other systems, entities, etc. to facilitate operations for various embodiments described herein. In various embodiments, network I/O interface(s) 1112 can be configured as one or more Ethernet port(s), Fibre Channel ports, any other I/O port(s), and/or antenna(s)/antenna array(s) now known or hereafter developed. Thus, the network processor unit(s) 1110 and/or network I/O interface(s) 1112 may include suitable interfaces for receiving, transmitting, and/or otherwise communicating data and/or information in a network environment.

I/O interface(s) 1114 allow for input and output of data and/or information with other entities that may be connected to computer device 1100. For example, I/O interface(s) 1114 may provide a connection to external devices such as a keyboard, keypad, a touch screen, and/or any other suitable input and/or output device now known or hereafter developed. This may be the case, in particular, when the computer device 1100 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as a display, particularly when the computer device 1100 serves as a user device as described herein. The display may have touch-screen display capabilities. Additional external devices may include a video camera and microphone/speaker combination.

In various embodiments, control logic 1120 can include instructions that, when executed, cause processor(s) 1102 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1120) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1104 and/or storage 1106 can store data, software, code, instructions (e.g., processor instructions), logic, parameters, combinations thereof, and/or the like used for operations described herein. This includes memory element(s) 1104 and/or storage 1106 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form a method is provided that includes joining, by a Messaging Layer Security (MLS) gateway, an MLS group as a first verified member of the MLS group for secure messaging among participants of the MLS group; transmitting, by the MLS gateway, first secure content obtained from a first participant to one or more second participants of the MLS group, wherein the first participant is a non-MLS capable participant, and wherein the one or more second participants of the MLS group are verified MLS capable participants; and transmitting, by the MLS gateway, second secure content obtained from the one or more second participants of the MLS group to the first participant.

In one example, the method further includes transmitting, by the MLS gateway, the second secure content obtained from the one or more second participants of the MLS group to a third participant, wherein the third participant is a non-MLS capable participant; and transmitting, by the MLS gateway, third secure content obtained from the third participant to the one or more second participants of the MLS group.

In another example, the method further includes joining, by the MLS gateway, the MLS group as a second verified member of the MLS group, wherein the MLS gateway acts on behalf of the first participant when the MLS gateway joins the MLS group as the first verified member, and wherein the MLS gateway acts on behalf of the third participant when the MLS gateway joins the MLS group as the second verified member. In another example, the MLS gateway vouches for an identity of the first participant.

In another example, transmitting the first secure content includes: obtaining the first secure content from the first participant; performing an MLS protocol operation on the first secure content to produce an encrypted MLS message that includes an identity of the first participant; and transmitting the encrypted MLS message to the one or more second participants of the MLS group. In another example, the MLS gateway is deployed on-premise in a network of a customer of a content provider service associated with the MLS group. In another example the MLS gateway is deployed in a network of a content provider service associated with the MLS group.

In another form, an apparatus is provided including a memory; a network interface configured to enable network communication; and a processor, wherein the processor is configured to perform operations associated with a Messaging Layer Security (MLS) gateway, the operations including: joining an MLS group as a first verified member of the MLS group for secure messaging among participants of the MLS group; transmitting first secure content obtained from a first participant to one or more second participants of the MLS group, wherein the first participant is a non-MLS capable participant, and wherein the one or more second participants of the MLS group are verified MLS capable participants; and transmitting second secure content obtained from the one or more second participants of the MLS group to the first participant.

In yet another form, one or more non-transitory computer readable storage media encoded with instructions are provided that, when executed by a processor of a Messaging Layer Security (MLS) gateway, cause the processor to execute a method including: joining an MLS group as a first verified member of the MLS group for secure messaging among participants of the MLS group; transmitting first secure content obtained from a first participant to one or more second participants of the MLS group, wherein the first participant is a non-MLS capable participant, and wherein the one or more second participants of the MLS group are verified MLS capable participants; and transmitting second secure content obtained from the one or more second participants of the MLS group to the first participant.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

joining, by a Messaging Layer Security (MLS) gateway, an MLS group as a first verified member of the MLS group for secure communication messaging among participants of the MLS group;

vouching, by the MLS gateway, for an identity of a first participant, wherein the first participant is a non-MLS capable participant;

transmitting, by the MLS gateway and to one or more second participants of the MLS group, a message indicating that the MLS gateway is acting on behalf of the first participant, wherein the message is an MLS message that is signed using credentials of the MLS gateway, and wherein the one or more second participants are verified MLS capable participants of the MLS group;

transmitting, by the MLS gateway, first secure content obtained from the first participant to the one or more second participants of the MLS group, wherein the first secure content is transmitted on behalf of the first participant and is associated with an identifier of the first participant; and transmitting, by the MLS gateway, second secure content obtained from the one or more second participants of the MLS group to the first participant.

2. The method of claim 1, further comprising:

transmitting, by the MLS gateway, the second secure content obtained from the one or more second participants of the MLS group to a third participant, wherein the third participant is a non-MLS capable participant; and transmitting, by the MLS gateway, third secure content obtained from the third participant to the one or more second participants of the MLS group.

3. The method of claim 2, further comprising:

joining, by the MLS gateway, the MLS group as a second verified member of the MLS group, wherein the MLS gateway acts on behalf of the first participant when the MLS gateway joins the MLS group as the first verified member, and wherein the MLS gateway acts on behalf of the third participant when the MLS gateway joins the MLS group as the second verified member.

4. The method of claim 1, wherein transmitting the first secure content comprises:

obtaining the first secure content from the first participant;

performing an MLS protocol operation on the first secure content to produce an encrypted MLS message that includes an identity of the first participant; and transmitting the encrypted MLS message to the one or more second participants of the MLS group.

5. The method of claim 4, wherein performing the MLS protocol operation on the first secure content comprises encrypting the first secure content using an encryption key maintained at the MLS gateway.

6. The method of claim 1, wherein the MLS gateway is deployed on-premise in a network of a customer of a content provider service associated with the MLS group.

7. The method of claim 1, wherein the MLS gateway is deployed in a network of a content provider service associated with the MLS group.

8. An apparatus comprising:

a memory;

a network interface configured to enable network communication; and a processor, wherein the processor is configured to perform operations associated with a Messaging Layer Security (MLS) gateway, the operations comprising:

joining an MLS group as a first verified member of the MLS group for secure messaging among participants of the MLS group;

vouching for an identity of a first participant, wherein the first participant is a non-MLS capable participant;

transmitting, to one or more second participants of the MLS group, a message indicating that the MLS gateway is acting on behalf of the first participant, wherein the message is an MLS message that is signed using credentials of the MLS gateway, and wherein the one or more second participants are verified MLS capable participants of the MLS group;

transmitting first secure content obtained from a first participant to the one or more second participants of the MLS group, wherein the first secure content is transmitted on behalf of the first participant and is associated with an identifier of the first participant; and transmitting second secure content obtained from the one or more second participants of the MLS group to the first participant.

9. The apparatus of claim 8, wherein the operations further comprise:

transmitting the second secure content obtained from the one or more second participants of the MLS group to a third participant, wherein the third participant is a non-MLS capable participant; and transmitting third secure content obtained from the third participant to the one or more second participants of the MLS group.

10. The apparatus of claim 9, wherein the operations further comprise:

joining the MLS group as a second verified member of the MLS group, wherein the MLS gateway acts on behalf of the first participant when the MLS gateway joins the MLS group as the first verified member, and wherein the MLS gateway acts on behalf of the third participant when the MLS gateway joins the MLS group as the second verified member.

11. The apparatus of claim 8, wherein the operation of transmitting the first secure content comprises:

obtaining the first secure content from the first participant;

performing an MLS protocol operation on the first secure content to produce an encrypted MLS message that includes an identity of the first participant; and transmitting the encrypted MLS message to the one or more second participants of the MLS group.

12. The apparatus of claim 11, wherein the operation of performing the MLS protocol operation on the first secure content comprises encrypting the first secure content using an encryption key maintained at the MLS gateway.

13. The apparatus of claim 8, wherein the MLS gateway is deployed on-premise in a network of a customer of a content provider service associated with the MLS group.

14. The apparatus of claim 8, wherein the MLS gateway is deployed in a network of a content provider service associated with the MLS group.

15. One or more non-transitory computer readable storage media encoded with instructions that, when executed by a processor of a Messaging Layer Security (MLS) gateway, cause the processor to execute a method comprising:

joining an MLS group as a first verified member of the MLS group for secure messaging among participants of the MLS group;

vouching for an identity of a first participant, wherein the first participant is a non-MLS capable participant;

transmitting, to one or more second participants of the MLS group, a message indicating that the MLS gateway is acting on behalf of the first participant, wherein the message is an MLS message that is signed using credentials of the MLS gateway, and wherein the one or more second participants are verified MLS capable participants of the MLS group;

transmitting first secure content obtained from the first participant to the one or more second participants of the MLS group, wherein the first secure content is transmitted on behalf of the first participant and is associated with an identifier of the first participant; and transmitting second secure content obtained from the one or more second participants of the MLS group to the first participant.

16. The one or more non-transitory computer readable storage media of claim 15, further comprising:

transmitting the second secure content obtained from the one or more second participants of the MLS group to a third participant, wherein the third participant is a non-MLS capable participant; and transmitting third secure content obtained from the third participant to the one or more second participants of the MLS group.

17. The one or more non-transitory computer readable storage media of claim 16, further comprising:

joining the MLS group as a second verified member of the MLS group, wherein the MLS gateway acts on behalf of the first participant when the MLS gateway joins the MLS group as the first verified member, and wherein the MLS gateway acts on behalf of the third participant when the MLS gateway joins the MLS group as the second verified member.

18. The one or more non-transitory computer readable storage media of claim 15, wherein transmitting the first secure content comprises:

obtaining the first secure content from the first participant;

performing an MLS protocol operation on the first secure content to produce an encrypted MLS message that includes an identity of the first participant; and transmitting the encrypted MLS message to the one or more second participants of the MLS group.

19. The one or more non-transitory computer readable storage media of claim 18, wherein performing the MLS protocol operation on the first secure content comprises encrypting the first secure content using an encryption key maintained at the MLS gateway.

20. The one or more non-transitory computer readable storage media of claim 15, wherein the MLS gateway is deployed on-premise in a network of a customer of a content provider service associated with the MLS group.

* * * * *